US012807399B2

(12) United States Patent
Minganti

(10) Patent No.: US 12,807,399 B2
(45) Date of Patent: Nov. 24, 2026

(54) CUP FOR A COFFEE CAPSULE

(71) Applicant: SACMI COOPERATIVA MECCANICI IMOLA SOCIETA' COOPERATIVA, Imola (IT)

(72) Inventor: Gianni Minganti, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 5 days.

(21) Appl. No.: 15/117,218

(22) PCT Filed: Feb. 24, 2015

(86) PCT No.: PCT/IB2015/051374
§ 371 (c)(1),
(2) Date: Aug. 8, 2016

(87) PCT Pub. No.: WO2015/128799
PCT Pub. Date: Sep. 3, 2015

(65) Prior Publication Data

US 2016/0355327 A1 Dec. 8, 2016

(30) Foreign Application Priority Data

Feb. 28, 2014 (IT) .................................. 2014A0101

(51) Int. Cl.
*B65D 85/80* (2006.01)
*B29B 11/10* (2006.01)
(Continued)

(52) U.S. Cl.
CPC .......... *B65D 85/8043* (2013.01); *B29B 11/10* (2013.01); *B29C 48/21* (2019.02);
(Continued)

(58) Field of Classification Search
CPC ............ B65D 85/8043; B65D 85/8046; B65D 85/816; B65D 85/804; B29B 11/10;
(Continued)

(56) References Cited

U.S. PATENT DOCUMENTS 5,840,189 A 11/1998 Sylvan et al.
6,645,537 B2 11/2003 Sweeney et al.
(Continued)

FOREIGN PATENT DOCUMENTS

EP 1604915 A1 12/2005
EP 1886942 B1 11/2009
(Continued)

OTHER PUBLICATIONS

Wikipedia, "Thermoforming", Jun. 27, 2013, pp. 1-4.
(Continued)

*Primary Examiner* — Ericson M Lachica
(74) *Attorney, Agent, or Firm* — Chrisman Gallo Tochtrop LLC

(57) ABSTRACT

A cup for a coffee capsule, including a containment body (2) extending between a bottom (2*a*) and an upper edge (2*b*) and further including, at the upper edge (2*b*), an annular flange (3) which extends around an axis (X) and which has a rear face (3*a*) directed towards the containment body (2) and a front face (3*b*) adapted to receive a sealing lid (40), where the containment body (2) and the annular flange (3) are defined by a multilayer structure having an inner layer (S1) made of a plastic material, defining the front face (3*b*) of the annular flange (3) and the inside surface of the containment body (2), an outer layer (S2) made of a plastic material whose hardness is less than that of the inner layer (S1), and an intermediate layer (S3) between the inner layer (S1) and the outer layer (S2) and made of a material impermeable to oxygen and aromas, and where the annular flange (3) has, on
(Continued)

its rear face (3*a*), an annular ridge or tooth (6) and an annular groove (4) which extend around the axis (X) and which are configured to act in conjunction with an end edge (101) of a pressure hood element (100) of a coffee machine.

16 Claims, 4 Drawing Sheets

(51) Int. Cl.

| | |
|---|---|
| ***B29C 48/21*** | (2019.01) |
| ***B29C 51/08*** | (2006.01) |
| ***B29C 51/14*** | (2006.01) |
| ***B29C 69/02*** | (2006.01) |
| ***B65D 85/804*** | (2006.01) |
| *B29K 23/00* | (2006.01) |
| *B29L 31/00* | (2006.01) |

(52) U.S. Cl.
CPC ............ *B29C 51/082* (2013.01); *B29C 51/14* (2013.01); *B29C 69/02* (2013.01); *B29K 2023/06* (2013.01); *B29K 2023/086* (2013.01); *B29K 2023/12* (2013.01); *B29K 2995/0067* (2013.01); *B29L 2031/7174* (2013.01)

(58) Field of Classification Search
CPC ....... B29C 51/082; B29C 51/14; B29C 69/02; B29K 2023/13
See application file for complete search history.

(56) References Cited

U.S. PATENT DOCUMENTS

| | | | | |
|---|---|---|---|---|
| 9,096,373 | B2 | 8/2015 | Rondelli | |
| 9,260,239 | B2 | 2/2016 | Amrein | |
| 9,540,167 | B2 | 1/2017 | Zweed | |
| 2003/0222089 | A1* | 12/2003 | Hale | B65D 85/8061 220/574 |
| 2008/0210098 | A1* | 9/2008 | Weijers | A47J 31/0678 99/295 |
| 2009/0175986 | A1* | 7/2009 | Doglioni Majer | B65D 85/8061 426/77 |
| 2010/0015307 | A1* | 1/2010 | Abegglen | B29C 45/14336 425/574 |
| 2010/0288131 | A1 | 11/2010 | Kilber | |
| 2011/0274794 | A1* | 11/2011 | Gerbaulet | B65D 85/8061 99/302 R |
| 2012/0225168 | A1* | 9/2012 | Kamerbeek | A23F 5/262 206/0.5 |
| 2012/0231123 | A1* | 9/2012 | Kamerbeek | B65D 85/8064 426/112 |
| 2012/0251677 | A1* | 10/2012 | Yoakim | A47J 31/22 426/112 |
| 2013/0064936 | A1* | 3/2013 | Meelker | B65D 85/8043 426/112 |
| 2013/0156899 | A1* | 6/2013 | Quinn | A47J 31/407 426/115 |
| 2013/0209618 | A1 | 8/2013 | Trombetta et al. | |
| 2013/0263423 | A1* | 10/2013 | Clark | A47J 31/0642 99/295 |
| 2013/0341478 | A1* | 12/2013 | Mariller | A47J 31/407 426/112 |
| 2014/0087028 | A1* | 3/2014 | Orsi | B65D 85/8064 426/77 |
| 2014/0170281 | A1* | 6/2014 | Zweed | B65D 53/02 426/433 |
| 2014/0196608 | A1 | 7/2014 | Amrein et al. | |
| 2014/0199442 | A1* | 7/2014 | Orsi | B65D 85/8043 426/112 |
| 2014/0318380 | A1 | 10/2014 | Doglioni | |
| 2015/0021209 | A1 | 1/2015 | Rondelli | |
| 2015/0201792 | A1* | 7/2015 | Doglioni Majer | B65D 17/404 426/425 |
| 2016/0037961 | A1 | 2/2016 | Digiuni | |

FOREIGN PATENT DOCUMENTS

| | | | |
|---|---|---|---|
| EP | 2465793 | A1 | 6/2012 |
| EP | 2489609 | A1 | 8/2012 |
| WO | 2010/137954 | A1 | 12/2010 |
| WO | 2012080501 | A1 | 6/2012 |
| WO | 2012118367 | A1 | 9/2012 |
| WO | 2012/138473 | A1 | 10/2012 |
| WO | 2013029184 | A1 | 3/2013 |
| WO | 2013076519 | A1 | 5/2013 |
| WO | 2013076551 | A1 | 5/2013 |
| WO | 2013132435 | A1 | 9/2013 |
| WO | 2013136209 | A1 | 9/2013 |
| WO | 2013157924 | | 10/2013 |
| WO | 2014012779 | A2 | 1/2014 |

OTHER PUBLICATIONS

Dixon, John, "Packaging Materials: 9. Multilayer Packaging for Food and Beverages", International Life Sciences Institute (ILSI), ILSI Europe Report Series, Jul. 2011, pp. 1-48.
Ruckverfolgbarkeit 52105.03 DELICA CafeRoyal Kaffeekapseln (Art.Nr. Delica 302820), 2 pages.
Ruckverfolgbarkeit 52368 DELICA CafeRoyal Kaffeekapseln (Art. Nr. Delica 303445), 3 pages.
Produktionsunterlagen Kapsel 52105.03 Cafe Royal, 4 pages.
Spezifikation, Bachmann Forming AG, PP EVOH PP PEPL schwarz 1.40 × 550 mm, 1 page.
Specification, Bachmann Forming AG, PP EVOH PP PEPL schwarz 1.20 × 458 mm, 1 page.
Cafe Royal 10er Espresso Migros, bought Nov. 2013, 1 page.

* cited by examiner

CUP FOR A COFFEE CAPSULE

TECHNICAL FIELD

The present disclosure relates to a cup for a coffee capsule, in particular a cup made of a plastic material, and a machine for making the cup and a coffee capsule comprising the cup.

BACKGROUND ART

Known in the prior art (for example, from patent documents WO2012/080501, EP2489609, WO2013/076519, WO2013/136209, US2010/288131 and WO2013/157924) are coffee capsules comprising a cup of plastic material, filled with a dose of coffee powder and closed by a lid defined by a circular panel sealed onto the cup. The cup has a flat annular flange onto whose front surface the lid is sealed. In use, the coffee capsules are inserted into a specific compartment of a coffee machine equipped with knives for perforating the capsule and with a hood (or lid) configured to clamp down on and seal the annular flange of the capsule in order to brew the coffee according to a method known in the trade of machines of this kind.

In some solutions, the knives intercept the capsule at the lid, to introduce steam or hot water through the lid. An example of this type of capsule is provided by patent document US2010/288131. Instead, other solutions provide that the blades intercept the capsule at the bottom of the cup. An example of this type of capsule is provided by the patent document WO2013/136209.

It should be noted that this disclosure refers in particular to cups and capsules designed to be opened at the bottom of the cup. In other words, this disclosure refers in particular to cups and capsules designed to be used in coffee machines whose knives perforate the capsule through the bottom of the cup.

In these coffee machines, a rear surface of the annular flange is pressed, during infusion, against an upper edge of a pressure hood element in such a way as to create a fluid-tight seal between the cup and the hood on the rear surface of the annular flange, at the bottom end of the cup, where the cup is perforated by the knives. In light of this, one of the requisites of the capsule is to create an optimum fluid-tight seal between the cup and the hood during use of the capsule in a coffee making machine.

The variability of the following three factors weigh negatively on the obtainment of a good seal: the shape of the pressure hood (forming part of the coffee making machine), the shape of the capsule and the centring, that is to say, the relative position between capsule and pressure hood in the coffee machine.

It should also be noted that other variations in the shape and size of the pressure hood may be caused by the operation of the coffee machine (changes in the temperature of the hood).

Further, the technology of capsules designed to be perforated at the bottom requires the capsule bottoms to be relatively rigid in order to facilitate the cutting action of the knives. This is generally obtained by increasing the thickness of the capsule bottom which, however, leads to problems of higher weight and higher production costs on account of the larger amount of material used.

Another need is that of preserving the aroma of the coffee. In this regard, it should be noted that some capsules currently available on the market have an outer wrapper (bag) made of a material which is impermeable to aromas and which must be torn manually at the moment of use. This solution is disadvantageous, however, because it involves additional costs and, in practice, is not fully effective in preserving the coffee aroma up to the moment the beverage is brewed.

Prior art cups do not meet the above mentioned requirements because they do not allow the production of plastic coffee capsules which guarantee high efficiency and reliability of use in coffee machines which perforate the bottoms of the capsules and which hold the cups tightly by the back of the annular flange of the cup itself.

DISCLOSURE OF THE INVENTION

This invention therefore has for an aim to provide a cup for a coffee capsule which overcomes the above mentioned disadvantages of the prior art and which meets the above mentioned requirements.

It is an aim of the disclosure to provide a cup for a coffee capsule which can create an optimum fluid tight seal with the hood during use. More specifically, the aim is to create a fluid tight seal which remains effective and robust even with variations in the capsule and in the coffee machine, as well as with variations in the shape and size of the pressure hood, in the shape of the capsule and in the centring of the pressure hood and the capsule relative to each other.

Another aim of the disclosure is to provide a cup for a coffee capsule which is light in weight and inexpensive to make.

A further aim of the disclosure is to provide a cup for a coffee capsule that can retain to a high degree the aroma of the coffee contained therein.

These aims are fully achieved by the cup according to the disclosure as characterized in one or more of the appended claims.

This disclosure also has for an object a coffee capsule comprising the cup and a method and machine for making the cup, according to one or more of the appended claims.

Another object of the disclosure is a method for making coffee using a capsule of the disclosure, according to one or more of the appended claims.

In particular, the present disclosure relates to a cup for a coffee capsule, wherein the capsule coffee is intended to be used in a coffee machine equipped with a pressure hood element (bell shaped) having an end edge, for providing a seal on the capsule.

The cup comprises a containment (housing) body, which extends between a bottom edge and an upper edge, and an annular flange, positioned at the upper edge of the container body.

The annular flange extends around an axis. Said axis is an axis of cylindrical symmetry for the capsule.

The annular flange has a rear face, facing the containment body, and a front face, adapted to receive a cup sealing lid, to form the capsule.

The containment body and the annular flange are defined (i.e. formed) by a multilayer structure. This multilayer structure has an inner layer made of plastic material, defining the front face of the annular flange and the inner surface of the container body. The multilayer structure also has an outer layer, made of soft plastic material; the outer layer defines the rear face of the annular flange and the outer surface of the containment body. Moreover, the multilayer structure has an intermediate layer, arranged between the inner layer and the outer layer, and made of a material impermeable to oxygen and aromas.

The annular flange has, on the rear face, an annular ridge and an annular groove, which extend around said axis (i.e. they surround said axis, that is, they are positioned around said axis). The annular projection and the annular groove are operatively coupled to the end edge of the pressure hood element, when the capsule is inserted into the coffee machine and the pressure hood element is activated. Thus, the annular ridge and the annular groove are configured to (that is, are adapted to) cooperate with the end edge of the pressure hood element of the coffee machine, to provide a seal between the pressure element and the capsule.

The fact that the outer layer of the capsule (which defines annular projection and the annular groove) is soft makes the cup particularly effective in achieving such a seal with the pressure element, during the production of the drink in the coffee machine.

Hence, the annular projection and the annular groove are configured to be able to act in conjunction with the end edge of the pressure hood element of the coffee machine; in other words, the annular projection and the annular groove are configured to be operatively active in conjunction with the end edge of a pressure hood element of the coffee machine.

BRIEF DESCRIPTION OF DRAWINGS

The technical features of the disclosure, with reference to the above aims, are clearly described in the appended claims and its advantages are more apparent from the detailed description which follows, with reference to the accompanying drawings which illustrate a preferred, non-limiting example embodiment of the disclosure and in which

DETAILED DESCRIPTION OF PREFERRED EMBODIMENTS OF THE INVENTION

Figure 1:
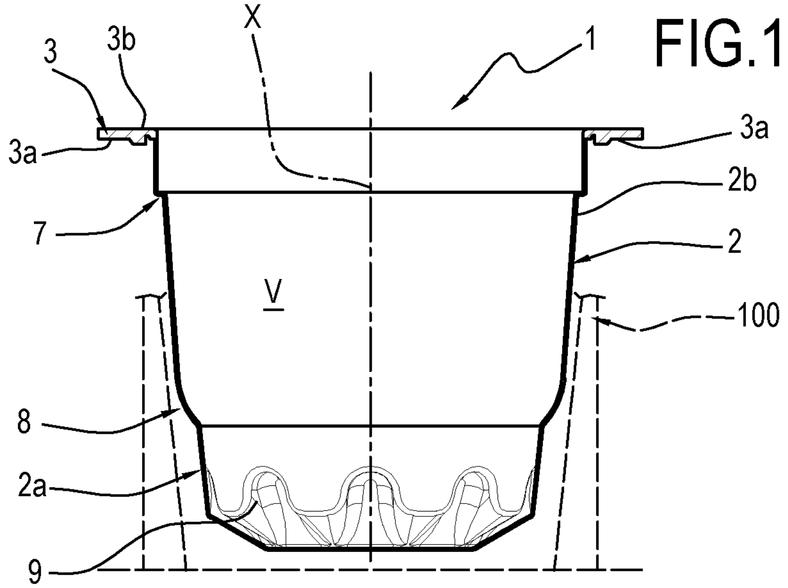
FIG. 1 illustrates a cup according to this description.
Figure 1A:
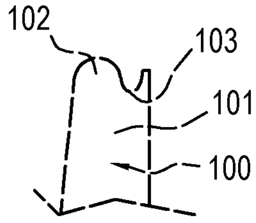
FIG. 1A shows a detail of a pressure hood designed to interact in use with the cup of FIG. 1.

With reference to the accompanying drawings, the numeral 1 denotes in its entirety a cup for a coffee capsule according to this disclosure.

The cup 1 is basically made up of two parts: a containment body 2 which internally defines a space "V" open at the top, for containing a dose 30 of coffee powder and which extends between a bottom 2*a* and an upper edge 2*b*, and an annular flange 3 located at the upper edge 2*b* of the containment body 2.

The annular flange 3 extends around an axis "X" which preferably constitutes an axial axis of symmetry of the containment body 2 and, still more preferably, of the entire cup The annular flange 3 lies mainly in a flat plane, perpendicular to the axis "X".

Figure 3:
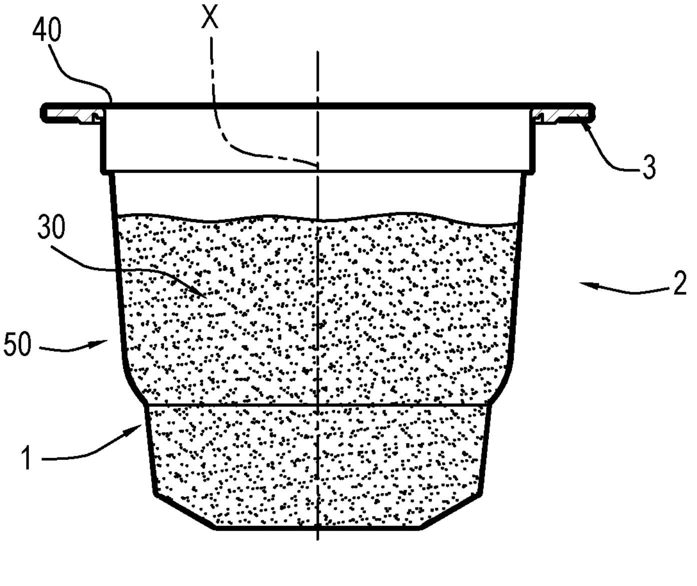
FIG. 3 illustrates a cup according to this description.
Figure 4:
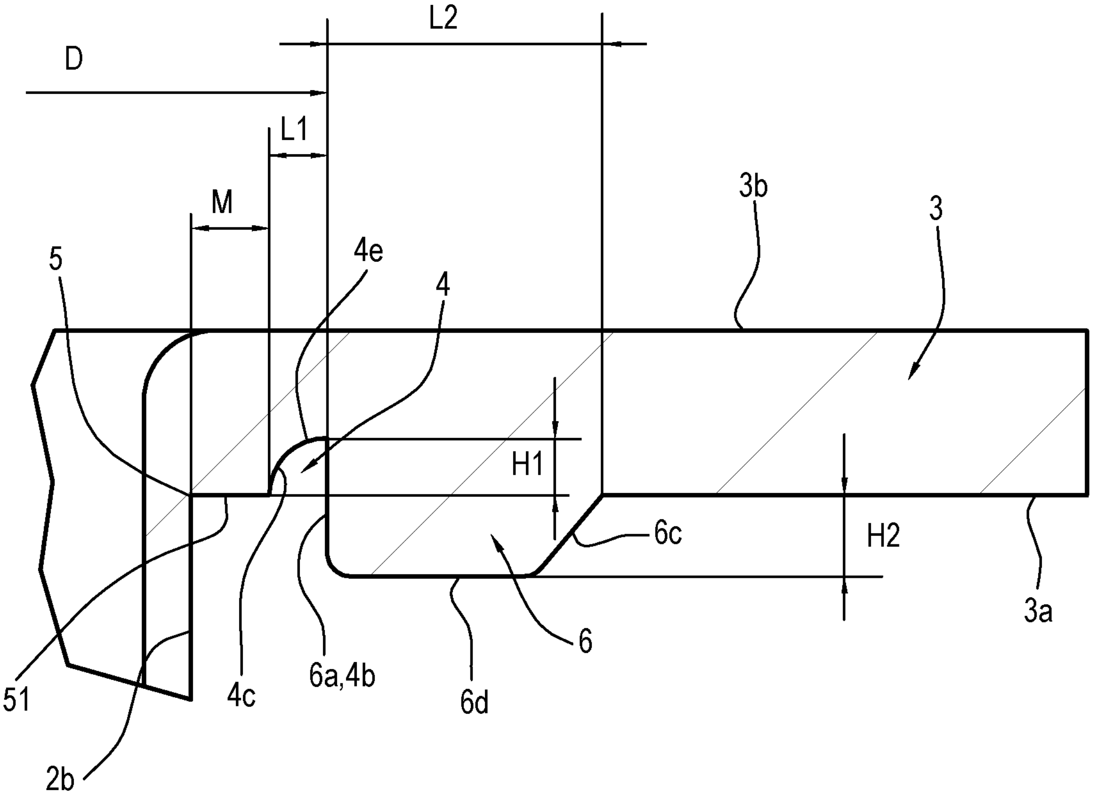
FIG. 4 shows the detail of FIG. 2, with parameters indicated.
Figure 5:
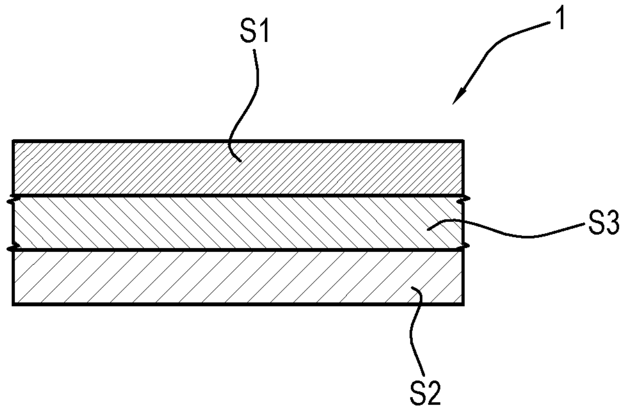
FIG. 5 shows a cross section of a part of the cup of FIG. 1.
Figure 6:
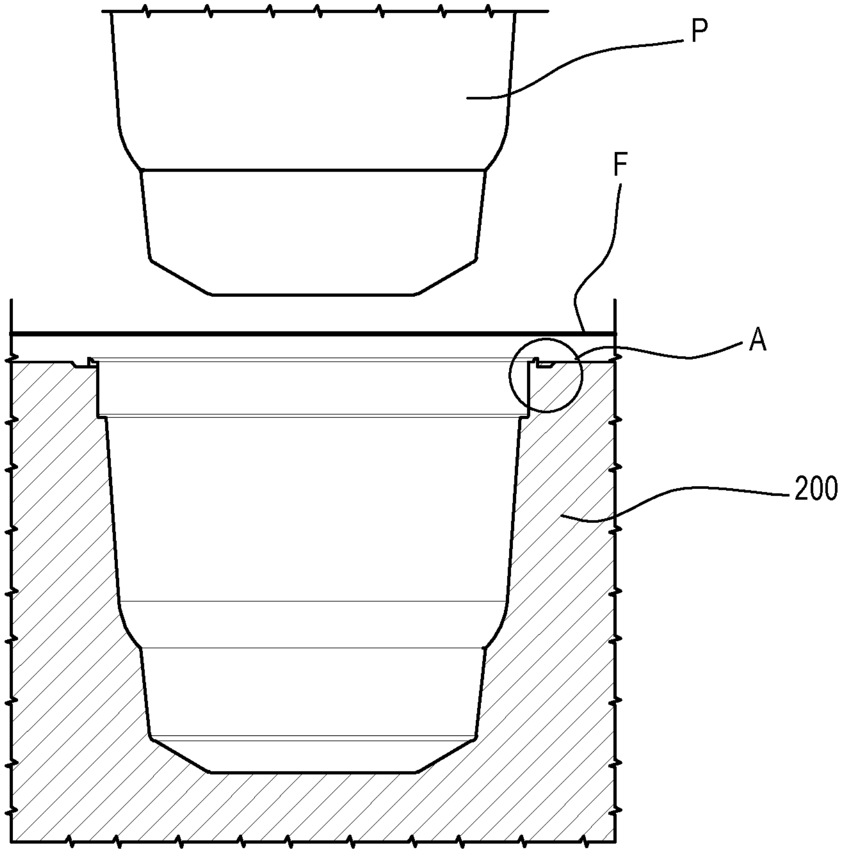
FIG. 6 schematically illustrates a machine for making a cup according to this description.
Figure 7:
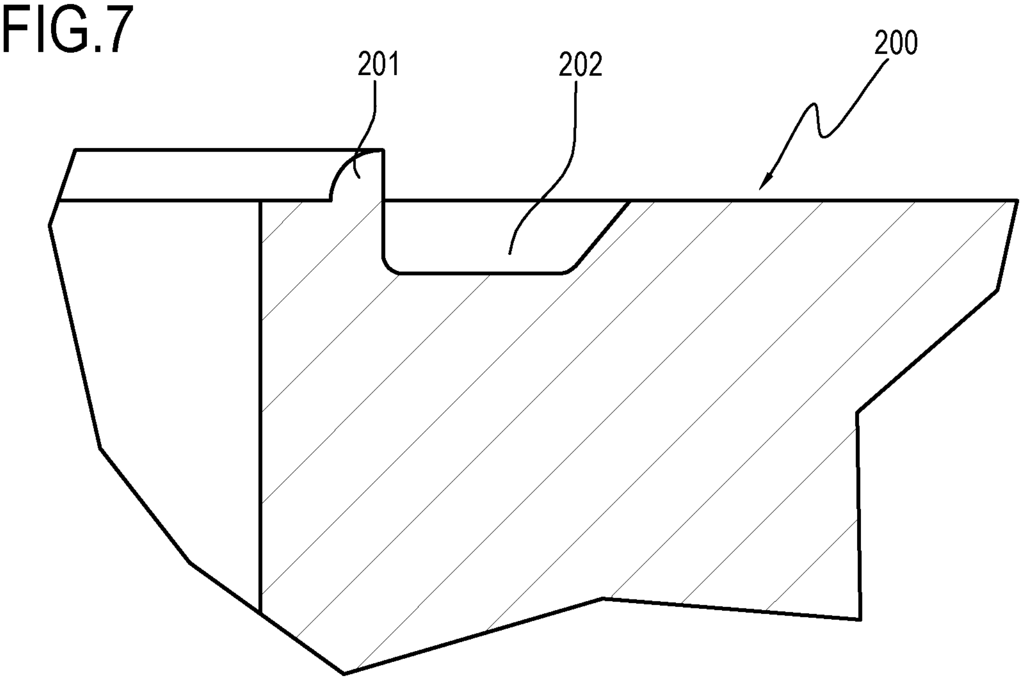
FIG. 7 shows an enlargement of the detail A from FIG. 6.
Figure 8:
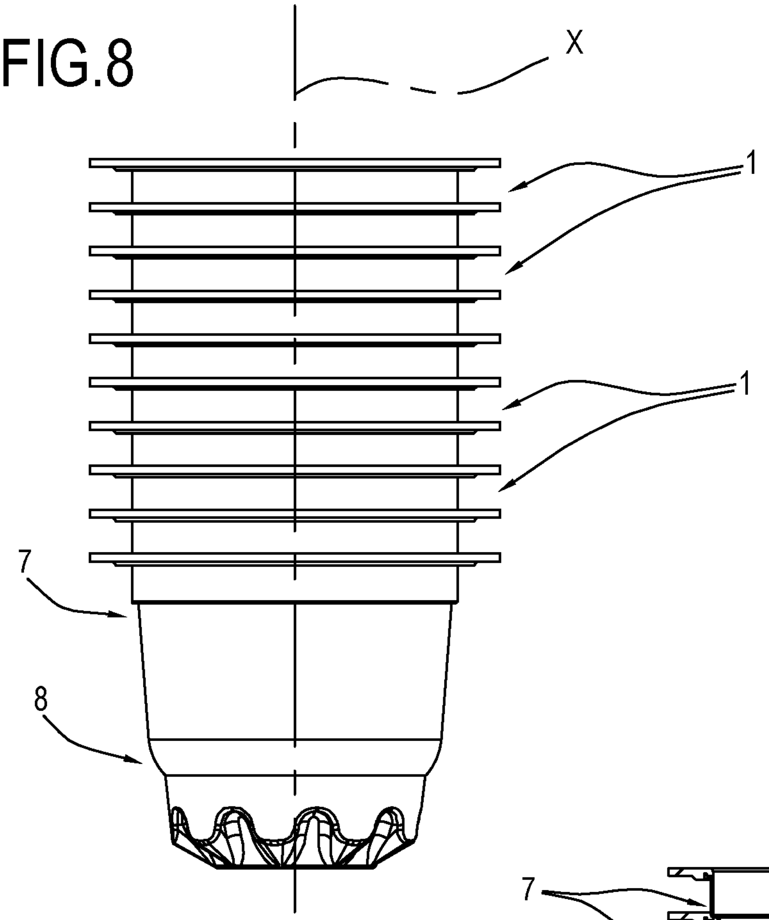
FIG. 8 shows a plurality of cups of FIG. 1 stacked on each other.
Figure 9:
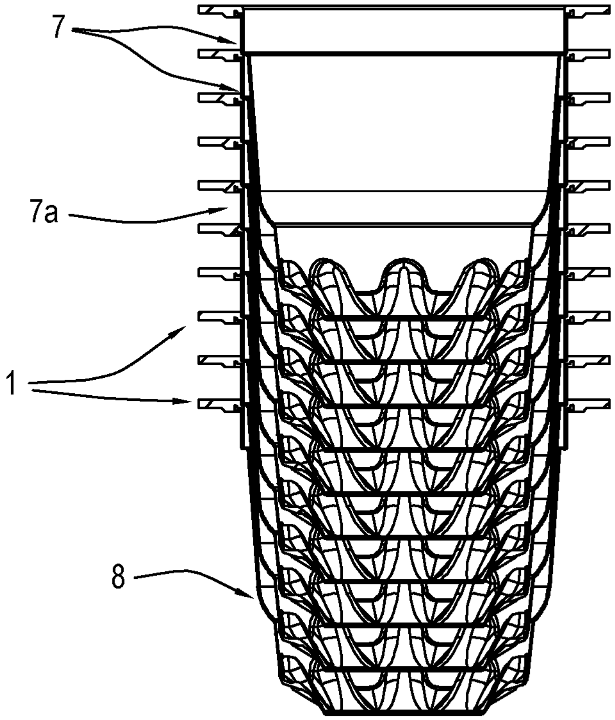
FIG. 9 shows the plurality of cups of FIG. 8 in a cross section view.

The annular flange 3 has a rear (or underside) face 3*a*, directed towards the containment body 2, and a front (or top) face 3*b*, adapted to receive a sealing lid/disc 40 applied to it in order to hermetically isolate the dose 30 of coffee inside the space "V" to obtain a capsule 50 as shown FIG. 3.

Advantageously, the annular flange 3 has, on its rear face 3*a*, an annular groove 4 which extends around the axis "X". The groove 4 is configured to act in conjunction with an end edge 101 of a pressure hood element 100 of an infusion machine to create a hermetic seal during infusion of the coffee contained in the cup 1.

The groove 4, which extends along a circular line centred on the axis "X", is therefore axisymmetric.

The groove 4 has a profile which, in transversal cross section (that is to say, perpendicularly to the line which the groove 4 extends along) is defined at least partly by a circular arc. As shown in the drawings, the groove 4 has a width "L1" (that is, a radial extension) of between 0.15 mm and 0.45 mm, preferably approximately 0.25 mm, measured diametrically relative to the axis "X".

The groove 4 has a depth "H1" of between 0.15 mm and 0.40 mm, preferably approximately 0.24 mm.

Further, the annular groove 4 is located at a position spaced from an annular joining zone 5 (that is, a transition zone of connection) joining to each other the upper edge 2*b* of the containment body 2 and the annular flange 3. Preferably, the annular groove 4 has an inner fastening edge 4*a* spaced from the annular joining zone 5 by a distance "M" of between 0.2 and 0.4 mm, preferably approximately 0.33 mm.

Preferably, therefore, the rear face 3*a* of the flange, in the proximity of the body 2 of the cup 1 defines a border 51, that is, an annular zone interposed between the body 2 (that is, the upper edge 2*b* of the containment body 2) and the groove 4 (that is, the fastening edge 4*a* of the groove 4). The border 51 is preferably flat, that is, without protrusions or grooves, and is substantially perpendicular to the axis X, that is to say, it extends radially. The width of the border 51 is labelled M.

The groove has three portions: an inside wall 4*c* (proximal to the body 2 of the cup 1), an outside wall 4*d* (distal from the body 2 of the cup 1), and a bottom wall 4*e* interposed between the inside wall 4*c* and the outside wall 4*d*.

Preferably, also, the annular flange 3 has on its rear face 3*a* an annular ridge or tooth 6. Preferably, the ridge 6 is adjacent to the groove 4. Preferably, the ridge 6 is on the outer side of the groove 4. The annular ridge 6 extends (axially) away from the rear face 3*a* of the annular flange 3 (that is, it protrudes from the rear face 3*a* of the annular flange 3).

Preferably, the annular ridge 6 has a fastening edge 6*a* coinciding with the outlet edge 4*b* of the groove 4.

Preferably, the annular ridge 6 has three portions: an inside wall 6*b* (proximal to the body 2 of the cup 1), an outside wall 6*c* (distal from the body 2 of the cup 1), and a top wall 6*d* interposed between the inside wall 6*b* and the outside wall 6*c*.

The annular ridge 6 has a width "L2" (that is, a radial extension) of between 1.0 mm and 1.4 mm, preferably approximately 1.17 mm, measured diametrically relative to the axis "X", and a depth "H2" of between 0.25 mm and 0.70 mm, preferably approximately 0.34 mm.

In other words, the top wall 6*d* of the ridge 6 (together with the outside wall 6*c*) has a width equal to "L2".

Preferably, the rear face 3*a* of the annular flange 3 has, in a transversal cross section in a plane through the axis, a profile having a rectilinear transition stretch "T" joining the annular groove 4 and the annular ridge 6 to each other and directed towards the axis "X". Preferably, the rectilinear stretch "T" is parallel to the axis "X". It might, however, also be inclined relative to the axis X, for example at an angle of inclination in the interval [0; 20] sexagesimal degrees made with the direction of the axis X towards the upper edge 2*b* of the body 2 of the cup, that is, towards the lid 40 of the capsule).

The rectilinear stretch "T" might be substituted for a change in concavity (inflection) with a vertical tangent, that is to say, parallel to the axis "X".

Preferably, the rectilinear stretch "T" is formed by the outside wall 4*d* of the groove 4 and the inside wall 6*b* of the ridge 6', which are arranged in sequence relative to each other and aligned in parallel to the axis "X".

The groove 4 and the ridge 6 extend around the axis "X" of the cup.

Preferably, the rectilinear stretch "T" formed by the outside wall 4*d* of the groove 4 and the inside wall 6*b* of the ridge 6 has a diameter "D" of between 30.34 mm and 30.74 mm, more preferably of approximately 30.54 mm.

Preferably, the inside wall 4*c* and the bottom wall 4*e* of the groove 4 define a curved profile, and more preferably, a circular arc. Preferably, the outside wall 4*d* of the groove 4 is rectilinear and parallel to the axis "X".

Preferably, the width "L2" of the ridge 6 is greater than the width "L1" of the groove 4.

Preferably, the width "L2" of the ridge 6 is greater than the width "M" of the border 51.

Preferably, the width "L2" of the ridge 6 is substantially equal to (or greater than) the sum of the width "L1" of the groove 4 and the width "M" of the border 51.

Preferably, the ratio between the width L2 and the quantity (M+L1) is in the interval [2, 3.5].

Preferably, the top wall 6*d* of the ridge 6 is flat or substantially flat.

Preferably, the wall 6*c* (the outside wall of the ridge 6) is inclined to form a bevel joining the ridge 6 to a portion of the of the rear face 3*a* of the flange 3 on the outer side of the ridge 6 itself.

Preferably, the wall 6*c* is inclined relative to the axis X at an angle of between 0 and 45 sexagesimal degrees.

As regards the shape of the rear face 3*a* of the flange 3, it should be noted that there are important aspects for the capsule seal.

For example, the fact that the rear face 3*a* of the flange 3 defines, in sequence, starting from the body 2 of the cup 1, the border 51, the groove 4 and the ridge 6 guarantees an effective seal for all the capsules and at all points of interface between the cup 1 and the pressure hood 100.

In light of this, it should be noted that the profile of the cup (at the flange 3) and/or that of the pressure hood might not be perfectly circular.

This, besides possible centring errors between the cup 1 and the pressure hood 100 in the coffee making machine, means that the pressure hood 100, depending on circumstances and the zone of the pressure hood 100 itself (within the 360 degrees of extension of the profile of the pressure hood 100) might come into contact with different zones of the rear face 3*a* of the flange.

Whatever the case, these zones will be between the border 51 and the ridge 6 (border 51 and ridge 6 included). This guarantees a good seal between the pressure hood 100 and the rear face 3*a* of the flange 3 at all times.

Preferably, the containment body 2 externally defines a step 7 at the top of it close to the upper edge 2*b* and/or a chamfer 8 located in the lower portion of the containment body 2.

The step 7 defines an external shoulder 7*a* designed to allow the cup 1 to rest on the annular flange 3 of an identical cup underneath it.

The chamfer 8, on the other hand, preferably has a rounded shape and defines a local reduction in the diameter of the containment body 2 in the direction of the bottom 2*a*, giving the containment body 2 an outer shape which tapers towards the bottom 2*a*.

The containment body 2 and the annular flange 3 are made in one piece.

The containment body 2 and the annular flange 3 have a multilayer structure comprising:

- an inner layer "S1" made of a plastic material, defining the front face 3*b* of the annular flange 3 and the inside surface of the containment body 2;
- an outer layer (S2) made of a soft plastic material whose hardness is preferably less than that of the inner layer "S1";
- an intermediate layer "S3" between the inner layer "S1" and the outer layer "S2" and made of a material impermeable to oxygen and aromas.

The inner layer "S1" is made of a material which can confer good rigidity on the bottom 2*a* of the containment body 2 when the bottom 2*a* itself is subjected to the cutting action of specific knives (not illustrated). This material is preferably polypropylene.

The outer layer "S2" is made of a material which is deformable enough to allow it to adhere to the corresponding upper edge 101 of the pressure hood element 100. This material preferably has a hardness which is less than that of the material the inner layer "S1" is made of. The outer layer "S2" is made preferably of PE. Alternatively, the outer layer "S2" might be made of PP or other materials.

It should be noted that the outer layer "S2" of the cup (that is, of the flange 3 of the cup) is made of a soft, deformable material. This material can undergo at least partly plastic deformation. Preferably, the material the outer layer "S2" is made of can also undergo at least partly plastic deformation. In light of this, it should be noted that the elasticity modulus of the layer S2 is preferably less than 1400 MPa. In other words, the elasticity modulus of the layer S2 is within the interval [0, 1400] MPa.

The intermediate layer is preferably made of EVOH.

The cup 1 is therefore made by a thermoforming process from a multilayer sheet "F", or piece of sheet comprising the above mentioned three layers "S1", "S2", "S3" and in turn obtained by means of an extrusion process.

This process thus allows obtaining a cup which is more rigid in the part of it directed towards the space "V", and softer on the opposite side, where the annular groove 4 and ridge 6 are formed.

Preferably, in order to increase the rigidity of the bottom 2*a* of the containment body 2, the latter may have stiffening ribs 9 arranged radially away from the axis "X".

One preferred embodiment of a method for making the cup 1 described above comprises a step of preparing a multilayer sheet "F", or piece of sheet (preferably extruded) with a pair of end layers "S1", "S2" made of plastic materials differing in hardness, and an intermediate layer "S3" located between the end layers "S1", "S2" and made of a material impermeable to oxygen and to aromas, and a subsequent step of subjecting the sheet "F" to a thermoforming action in order to give the sheet "F" a three-dimensional shape comprising the containment body 2.

It should be noted that there is also a step of selecting the thickness of the layers S1, S2 and S3 to strike a compromise between the requirements of the forming process and those of keeping the quality of the product contained in the capsule, for example by selecting different values for the thickness of the three layers.

Thermoforming is accomplished by means of a forming die 200 having an annular protrusion 201 which is shaped to match the groove 4 in order to impress the shape of the groove 4 on the sheet "F", and acting in conjunction with an upper punch "P" designed to press the sheet "F" against the forming die 200 below and to give the sheet "F" a three-dimensional shape defining the cup 1. The forming die 200 also has an annular recess 202 adjacent to the annular protrusion 201 and shaped to match the annular ridge 6 to impress the shape of the annular ridge 6 on the sheet "F".

During thermoforming, the forming die 200 is placed in contact with the outer layer "S2" made of less hard plastic material.

One preferred embodiment of a machine for making the cup 1 described above comprises a feeder (not illustrated because it is of known type) for feeding a multilayer sheet "F", or piece of sheet, and a thermoforming device configured to give the sheet "F" a three-dimensional shape comprising the containment body 2, where the thermoforming device comprises a forming die 200 of the type just described.

The advantages of using the cup 1 according to the disclosure, as described above, are particularly evident in a process for making coffee using a capsule 50 made with the cup 1. More specifically, according to this process, the cup 1 is inserted into a coffee machine having a hollow pressure hood element 100 adapted to receive the bottom 2*a* of the cup 1, and having the aforementioned end edge 101 adapted to act in conjunction with the rear face 3*a* of the annular flange 3.

Figure 2:
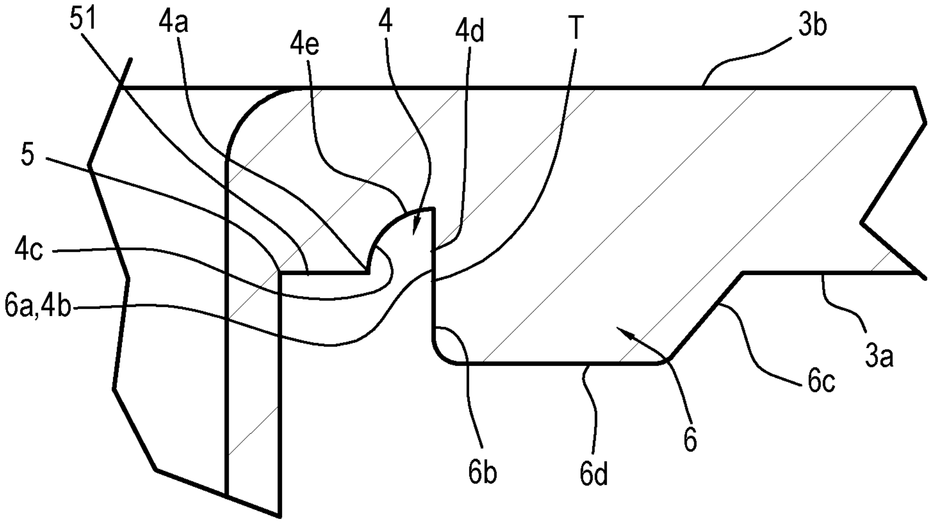
FIG. 2 shows a detail of the cup of FIG. 1.

More specifically, as illustrated in FIGS. 1 and 2, the end edge 101 has an annular protrusion 102 designed to be inserted into the annular groove 4 of the cup 1, and an annular recess 103 designed to receive the annular ridge 6 of the cup 1.

Thus, the annular protrusion 102 and the annular recess 103 are arranged in sequence relative to each other, with the annular recess 103 on the outer side of the annular protrusion 102.

The end edge 101 of the pressure hood element 100 is designed to be pressed against the rear face 3*a* of the annular flange 3 of the cup in such a way as to produce an at least partly plastic deformation of the outer layer "S2" of the cup 1, made of softer material. Preferably, this deformation is also partly elastic.

Preferably, also, the end edge 101 of the pressure hood element 100 and the part of the rear face 3*a* of the annular flange 3 of the cup 1 having the groove 4 and the annular ridge 6 are shaped to fit snugly together with an interference fit, that is to say, producing deformation of the outer layer "S2" at least at a side wall of the groove 4. Preferably, this deformation occurs at the rectilinear stretch "T" described above, as shown FIG. 2 which shows the non-deformed profiles of the annular flange 4 and of the end edge 101 of the pressure hood element 100, as well as the deformed configuration after the two parts are pressed together. This may be achieved by undersizing the width of the annular groove 4 relative to the annular protrusion 102 and/or by oversizing the width of the annular ridge 6 relative to the annular recess 103.

It should also be noted that it is also possible (thanks to the shape and size variability of the pressure hood and cup) that the interference and consequent deformation occur at the top (flat) part of the tooth 6 or outside wall of the tooth (inclined at an angle of between 0° and 45°).

During movement of the pressure hood element 100 (prior to activating the hermetic seal) suitable knives (not illustrated in the drawings) cut the bottom 2 of the cup 1 so that the dose of coffee 30 is sprayed with water or steam at a high temperature and thus starting the coffee brewing process.

The present disclosure achieves the present aims, overcoming the disadvantages of the prior art.

Indeed, the combination of the multilayer structure (and more specifically, the three-layer structure) with the geometry of the rear face of the annular flange, with annular groove and ridge, allows considerably improving the hermetic seal between the capsule and the pressure hood element during use, in particular during the compressive action applied by the pressure hood element.

The advantages in terms of seal effectiveness are offered by the greater softness of the outer layer, which is thus more easily deformed upon contact with the suitably shaped end edge of the pressure hood element.

At the same time, the greater rigidity of the inner layer allows increasing cup strength (which is further enhanced by the stiffening ribs at the bottom of the cup), allowing savings in material.

The multilayer structure is, moreover, easily deformed by means of a thermoforming process starting from a sheet of multilayer material, thus simplifying the production process of the cup.

Furthermore, the presence of the intermediate layer configured to prevent the passage of gas, in particular, oxygen and aromas, (for example, EVOH or other materials which can create a barrier to oxygen and aromas) allows the coffee aroma to be kept inside the capsule without having to further pack the capsule in any outer wrappers.

The aroma-impermeable layer is also impermeable to oxygen. The presence of oxygen inside the capsule is thus limited and oxidation of the coffee inside the capsule is limited accordingly.

The aroma-impermeable layer works both ways. Thus, it also prevents extraneous aromas from permeating into the capsule from the outside.

Further, the material of the inner layer S1 and/or the material the outer layer S2 is made of is a material impermeable to humidity (for example, PP, or alternatively, PE), with evident advantages in terms of storability, maintenance of product quality and correct powder density.

The shape of the rear face 3*a* of the flange allows the hermetic seal to be further improved by producing deformation of the outer layer of the rear face 3*a* of the flange in a zone of contact and compression between the rear face 3*a* of the flange itself and the pressure hood 100. More specifically, the shape of the rear face 3*a* of the flange guarantees an optimum seal along the entire capsule profile, even if the pressure hood 100 does not have a perfectly circular profile and/or is not perfectly centred relative to the axis of the capsule.

The presence of the step and of the chamfer also allow the usability of the capsule to be improved.

The step 7, located in the upper half of the cup 1, preferably in the proximity of the annular flange 3*a*, makes it easier to stack identical cups, with obvious advantages in terms of transportability and storage.

The chamfer 8, on the other hand, is located in the bottom half of the cup 1 and gives the cup a slender, tapered configuration, making it easier to extract the cup from the pressure hood element after use.

Another function of the chamfer 8 is to prevent impact between the pressure hood 100 and the bottom and/or side of the capsule 50 during movement of the pressure hood. This advantageously avoids the risk of the capsule being deformed before the capsule is perforated and the seal is created between the pressure hood and the capsule.

In another embodiment, this description provides a cup 1 for a capsule 50 (for coffee or other infusion), comprising a containment body 2 which extends between a bottom 2*a* and an upper edge 2*b* and comprises, at the upper edge 2*b*, an annular flange 3 extending around the axis X.

The annular flange 3 has a rear face 3*a* directed towards the containment body 2 and a front face 3*b* adapted to receive a lid 40 for closing the cup to form the capsule.

The containment body 2 and the annular flange 3 may be made of any material. For example, they may be made of aluminium, or they may be defined by a multilayer structure as described above.

It should also be noted that the cup 1 might be used to make capsules filled with products other than coffee, to make hot or cold beverages or infusions of other kinds (for example, using tea powders, barley or other infusion products) but always creating a fluid-tight seal between a pressure hood element 100 and a flange 3 of the cup 1.

Whatever the case, the annular flange 3 has a soft, deformable portion on its rear face 3*a*. This portion is made of a material which is deformable at least partly plastically. Preferably, the material is deformable also at least partly elastically, with an elasticity modulus preferably less than 1400 MPa.

In this embodiment, the annular flange 3 has, on its rear face 3*a*, an annular groove 4 which extends around the axis X. The groove 4 is configured to act in conjunction with an end edge 101 of a pressure hood element 100 of a coffee machine.

The annular flange 3 has on its rear face 3*a* an annular ridge 6. The ridge 6 is preferably adjacent to the groove 4. The ridge 6 is on the outer side of the selfsame groove 4. The ridge 6 extends away from the rear face 3*a* of the annular flange 3.

Preferably, the rear face 3*a* of the annular flange 3 has, in a transversal cross section in a plane through the axis, a profile having a rectilinear transition stretch "T" (substantially parallel to the axis X), defined by corresponding walls of the annular groove 4 and annular ridge 6 and directed towards the axis X.

Preferably, the annular ridge 6 has a radial extension which is greater than the radial extension of the groove 4.

Preferably, the rear face 3*a* of the annular flange 3 has an annular zone 51 extending radially and interposed between the upper edge 2*b* of the containment body 2 and the groove 4.

Preferably, a radial extension M of the annular zone 51, a radial extension L1 of the groove 4 and a radial extension L2 of the annular ridge 6 satisfy the following relation:

$$L2=k\ (M+L1)$$

where k is a number in the interval [2; 3.5].

Preferably, the annular ridge 6 has an outside wall 6*c* which is distal from the body 2 of the cup 1 and which is inclined to form a bevel joining the ridge 6 to a portion of the of the rear face 3*a* of the flange 3 on the outer side of the ridge 6 itself. Preferably, the inclination of the outside wall 6*c* relative to the axis X makes an angle of between 0 and 45 sexagesimal degrees.

It should be noted that the annular zone 51, the groove 4 and the annular ridge 6 are made of the aforementioned soft, deformable material. In other words, they form on the rear face 3*a* of the annular flange 3 a zone which is made of the aforementioned soft, deformable material.

Thus, when the coffee is brewed in the coffee machine, the movement of the pressure hood element 100 against the rear face 3*a* of the annular flange 3 causes deformation of the outer layer S2 of the annular flange 3 at one or more of the following portions of the annular flange 3 (or at least part of them): the annular groove 4; the annular ridge 6; a rectilinear stretch T of transition between the groove 4 and the annular ridge 6; an annular zone 51 extending radially and interposed between the upper edge 2*b* of the containment body 2 and the groove 4. In all these cases (that is, for all the zones of the annular flange 3 just mentioned), the seal between the flange 3 and the pressure hood 100 is effective because it involves at least partly plastic deformation of the deformable material (of the outer layer S2) of the annular flange 3 against the pressure hood 100.

Indeed, in use, the end of the pressure hood 100 comes into contact with the rear face 3*a* of the annular flange 3 in one of the following ways, alternatively:

i) the end of the pressure hood 100 interacts with one of the aforementioned portions of the annular flange 3 (border 51, groove 4 or ridge 6), causing deformation of at least that portion;

i) the end of the pressure hood 100 interacts with two adjacent portions of the aforementioned portions of the annular flange 3 (border 51, groove 4 or ridge 6), causing deformation (at least partial) of both of the portions.

Whatever the case, thanks to the shape of the face 3*a* of the flange 3 according to this description, the seal is guaranteed.

This has the advantage of guaranteeing an effective seal even if the profile of the pressure hood 100 or of the flange 3 is not regular or perfectly circular (where such irregularity might, for example, be due to wear of the pressure hood) or if the pressure hood and the capsule are not well centred—and allow interaction between the pressure hood 100 and the flange 3 to occur simultaneously in different zones of the annular flange 3 (that is, zones of the annular flange 3 at different radial distances from the axis X of the capsule).

The invention claimed is:

1. A cup for a coffee capsule, comprising a containment body extending between a bottom and an upper edge and further comprising, at the upper edge, an annular flange which extends around an axis and which has a rear face directed towards the containment body and a front face adapted to receive a cup sealing lid to form the capsule, wherein the containment body and the annular flange are defined by a multilayer structure having an inner layer made of a plastic material with a first hardness, the inner layer defining the front face of the annular flange and the inside surface of the containment body, an outer layer, the outer layer defining the outside surface of the containment body and being made of a plastic material with a second hardness that is lower than the first hardness, so that the plastic material of the outer layer is softer than the plastic material of the inner layer, and an intermediate layer between the inner layer and the outer layer, made of a material impermeable to oxygen and aromas, and wherein the annular flange has, on its rear face, an annular ridge and an annular groove which extend around the axis, and wherein the annular ridge and the annular groove are configured to come into contact with an end edge of a pressure hood element of a coffee machine to provide a seal between the pressure hood element and the capsule, wherein the rear face of the annular flange lays on a reference plane, wherein the annular groove forms a recess with respect to the reference plane and bas a depth, the recess being directed towards the upper edge of the containment body, and wherein the annular ridge forms a protrusion protruding from the reference plane towards the bottom end of the containment body, the protrusion having a top wall forming a plateau, the top wall of the annular ridge including a flat portion having a radial extension, and the annular groove having a maximum radial extension, wherein the radial extension of the flat portion of the top wall of the annular ridge is at least double the maximum radial extension of the annular groove, and wherein the plastic material with the second hardness of the outer layer is deformable, so that it undergoes at least partly plastic deformation upon interacting with the pressure hood element, wherein the outer layer defines both the seal provided at the rear face of the annular flange and the outer surface of the containment body, so that the annular ridge and the surface of the containment body are made of the plastic material with the second hardness, and wherein the annular groove is a single annular groove, and the annular ridge is a single annular ridge.

2. The cup according to claim 1, wherein the plastic material with the first hardness of the inner layer is more rigid material than the plastic material with the second hardness of the outer layer.

3. The cup according to claim 1, wherein the annular ridge is adjacent to the annular groove on the outer side of the annular groove and extends away from the rear face of the annular flange.

4. The cup according to claim 1, wherein the rear face of the annular flange has, in a transversal cross section in a plane through the axis, a profile having a portion substantially parallel to the axis, defined by corresponding walls of the annular groove and annular ridge and directed towards the axis.

5. The cup according to claim 1, wherein the annular ridge has a radial extension between 1.0 mm and 1.4 mm and a depth between 0.25 mm and 0.70 mm.

6. The cup according to claim 1, wherein the rear face of the annular flange has an annular zone extending radially and interposed between the upper edge of the containment body and the groove, wherein a radial extension (M) of the annular zone, a radial extension (L1) of the groove and a radial extension (L2) of the annular ridge satisfy the following equation:

$$L2=k(M+L1)$$

wherein k is a number in the interval [2; 3.5].

7. The cup according to claim 1, wherein the annular ridge has an outside wall which is distal from the containment body of the cup and which is inclined to form a bevel joining the ridge to a portion of the rear face of the flange on the outer side of the ridge itself, wherein the outside wall is inclined relative to the axis at an angle of between 0° and 45° sexagesimal degrees.

8. The cup according to claim 1, wherein the upper edge of the containment body and the annular flange define an annular joining zone, and wherein the groove is located at a position spaced from the annular joining zone.

9. The cup according to claim 1, wherein the containment body has, at the upper edge thereof, a step defining an external shoulder adapted to rest on the annular flange of other identical cups lying in a stacked configuration with said cups.

10. The cup according to claim 1, wherein the containment body has, in a bottom portion thereof, a chamfer rounded in shape, defining a local reduction in the diameter of the containment body in the direction of the bottom.

11. The cup according to claim 1, wherein the inner layer is made of polypropylene (PP) or polystyrene (PS), the outer layer is made of polyethylene (PE) or PP and the intermediate layer is made of ethylene vinyl alcohol (EVOH) or other material which can form a barrier to oxygen and aromas.

12. The cup according to claim 1, wherein the rear face of the flange, at the containment body of the cup, has a border defining an annular zone interposed between the containment body and the annular groove, wherein said border is flat and extends radially.

13. The cup according to claim 12, wherein the annular ridge has a radial width which is greater than a radial width of the said border.

14. The cup according to claim 1, wherein the annular ridge has an inside wall, proximal to the containment body of the cup, and an outside wall, distal from the containment body of the cup, wherein the outside wall of the annular ridge is inclined to form a bevel joining the annular ridge to a portion of the rear face of the annular flange on an outer side of the annular ridge itself.

15. The cup according to claim 1, wherein the rear face of the annular flange has, in a transversal cross section in a sectional plane including the axis and orthogonal to the reference plane, a profile having a transition stretch joining the annular groove and the annular ridge to each other, wherein the transition stretch is parallel to the axis, or is inclined relative to the axis at an angle of inclination in the interval [0; 20] sexagesimal degrees.

16. The cup according to claim 1, wherein the annular ridge has an inside wall, proximal to the containment body of the cup, and an outside wall, distal from the containment body of the cup, the annular groove has an inside wall, proximal to the containment body of the cup, and an outside wall, distal from the containment body of the cup, a portion formed by the outside wall of the annular groove and the inside wall of the annular ridge has a diameter between 30.34 mm and 30.74 mm.

* * * * *